Figure 1:
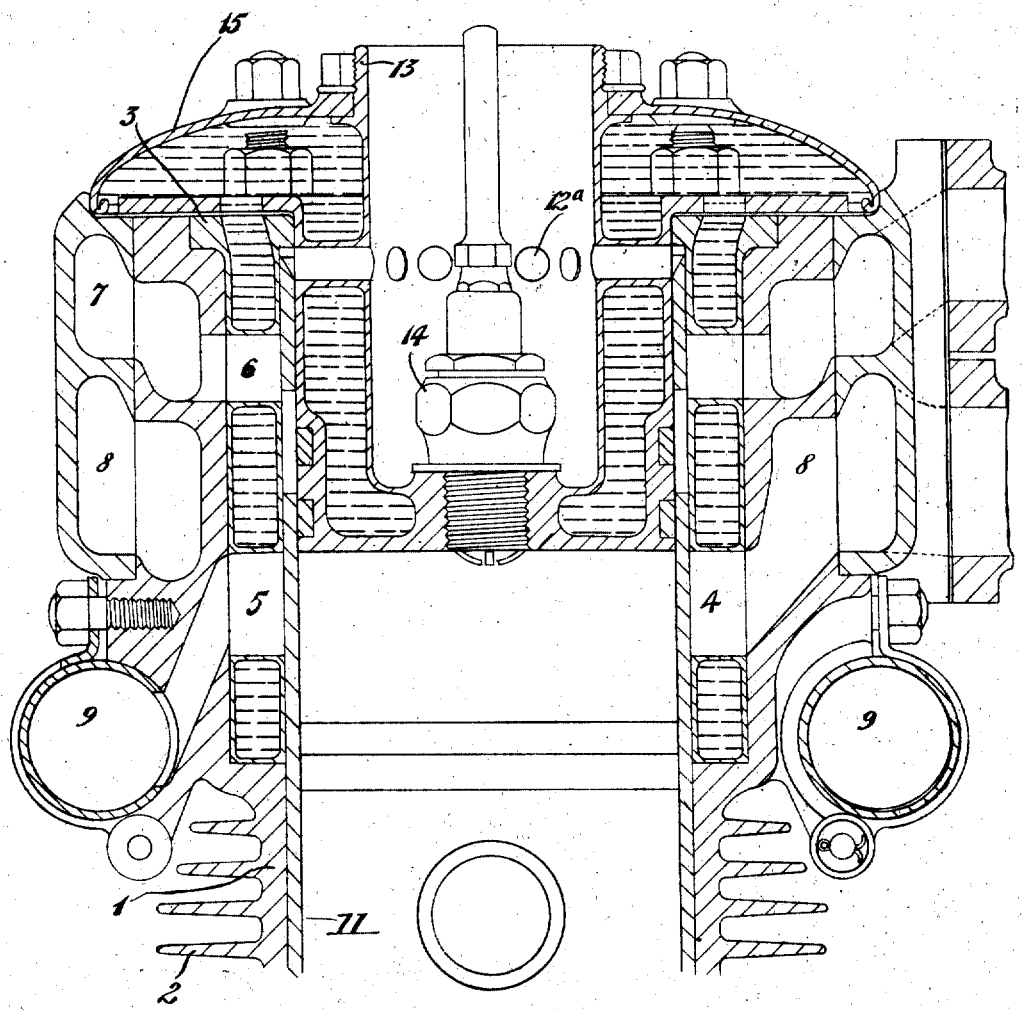

P. BURT.
INTERNAL COMBUSTION ENGINE.
APPLICATION FILED FEB. 7, 1916.

1,248,801.

Patented Dec. 4, 1917.
5 SHEETS—SHEET 1.

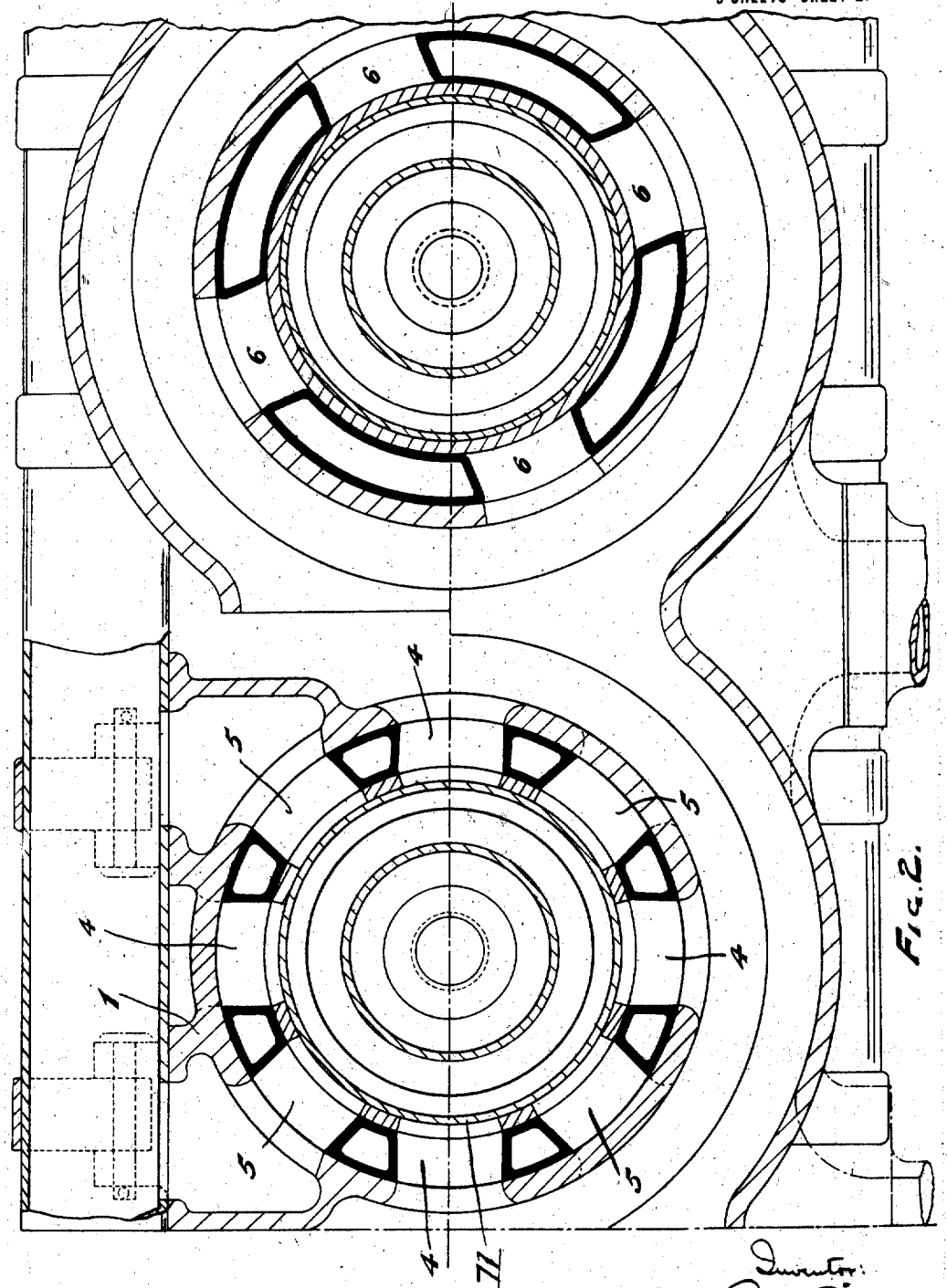

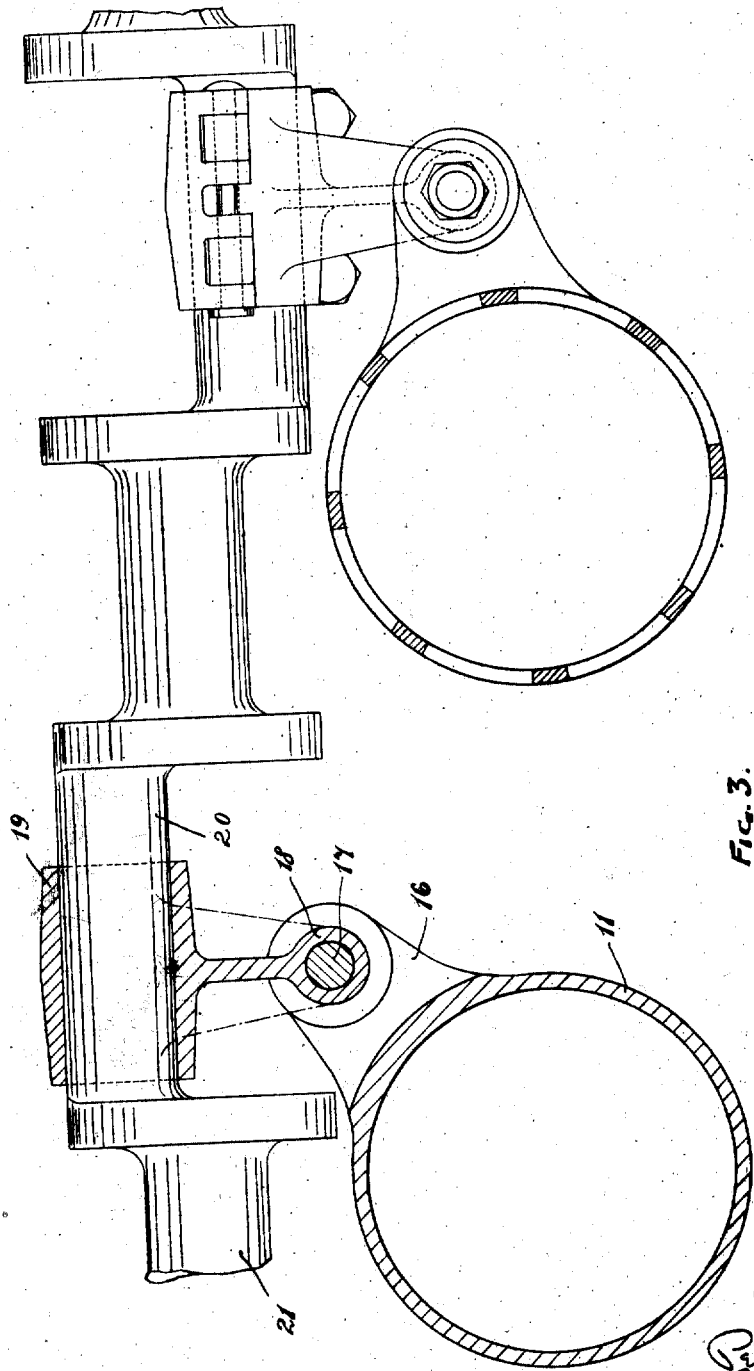

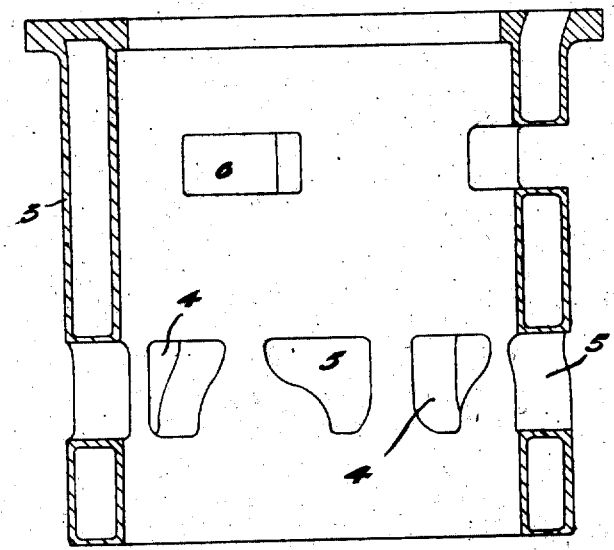

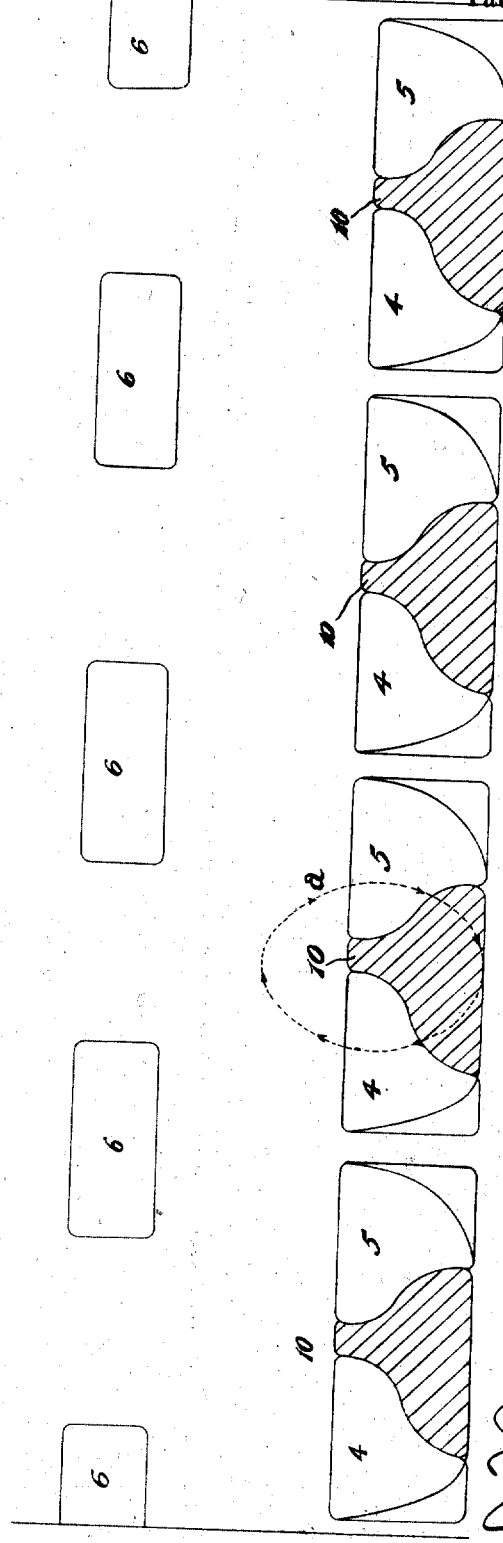

UNITED STATES PATENT OFFICE.

PETER BURT, OF BOTHWELL, SCOTLAND.

INTERNAL-COMBUSTION ENGINE.

1,248,801.      Specification of Letters Patent.      Patented Dec. 4, 1917.

Application filed February 7, 1916. Serial No. 76,607.

*To all whom it may concern:*

Be it known that I, PETER BURT, a subject of the King of the United Kingdom of Great Britain and Ireland, and residing at Bothwell, Lanarkshire, Scotland, have invented a certain new and useful Improvement in Internal-Combustion Engines, of which the following is a specification.

This invention relates to improvements in internal combustion engines operating on the four-stroke cycle, and of the type wherein the cylinder is fitted with an internal sleeve valve device separate from the engine piston and adapted to perform a combined oscillatory and reciprocatory movement.

Though applicable to water-cooled engines, the improvements are devised partly with the object of adapting the sleeve valve to an air-cooled engine, and of obtaining with an air-cooled engine the advantages attributable to the use of a sleeve valve.

A further object is to provide a simple arrangement which permits of water-cooling in the case where water cooling is desired or required.

An additional object is to provide a construction such that the cylinder need not be subjected to the special operations involved, for example, in cutting in the cylinder wall accurately plotted ports for admission and exhaust, the special operations being effected on a stationary liner fixed in the interior of the cylinder within which the valve telescopes; or the liner may be double-walled, the space between the walls being traversed by short tubes of the requisite caliber and contour to present the desired port formation.

With the use of such a liner it is possible, for example, to use a cylinder of aluminum or alloy of a low melting point, in conjunction with a liner of say cast iron, steel or brass, such liner forming the valve seat and having the necessary heat-resisting qualities or, if double walled, being in communication with a water cooling system.

A further object is to provide an arrangement of passages and ports such that local overheating of the cylinder especially in the neighborhood of the exhaust ports and, if desired, also in the neighborhood of the sparking plug, may be as far as possible counteracted by the cooling action of the cold air and carbureted mixture on the parts of the cylinder in close proximity thereto.

The arrangement whereby this object is accomplished also permits the attainment of a maximum port opening, and the convenient use of a valve each port of which serves alternately for admission and exhaust, the admission of the relatively cool mixture counteracting to some extent the effect of the heating action of the exhaust gases on the port edges.

These and other objects are accomplished with the preferred construction of engine hereinafter described, and embodying features of novelty pointed out in the appended claims.

Figure 1 of the accompanying drawings is a vertical section of an internal combustion engine embodying the invention; Fig. 2 a cross section partly through the inlet and exhaust ports of the liner and partly through the air ports; Fig. 3 a plan view of the valve-driving gear; Fig. 4 a detail view of a ported liner constructed in accordance with the invention; and Fig. 5 an expanded view showing diagrammatically the form and arrangement of the ports in the liner and in the sleeve valve.

As herein shown, the cylinder 1, which may be of aluminum, and may be provided externally with radiating fins 2, receives at its upper end a stationary tubular liner 3 which in the case selected for illustration, is double-walled and in which are fitted tubes presenting inlet ports 4 and exhaust ports 5 and also air admission ports 6; the inlet ports 4 and exhaust ports 5 alternating.

In Fig. 5 the hatched spaces indicate the ports 10 formed in the valve 11.

The dotted elliptical line *a* represents the path of a point on the valve.

A rigid envelop formed with open channels which, when the envelop is in place, afford in conjunction with channels in the outer walls of the cylinder casting two passages 7 and 8 in close proximity to one another, is slipped over the cylinder casting so as to be readily removable. The air to be carbureted flows through the passage 7 by way of the ports 6. The inlet ports 4 for the mixture communicate with the passage 8. The exhaust ports 5 communicate with outlet 9.

Desirably, the air to be carbureted enters a ported hollow head 13 projecting into the interior of the cylinder 1, the passage being so formed that the air is carried as closely as possible to the plug 14, so that the cold entering air may cool the part of the plug 14 exterior to the cylinder 1; thence the air is led, more or less preheated, by way of the ports 12ª and the air ports 6 controlled by the upper end of the valve 11, passing through the ports 6 to the passage 7, thence to and past the carbureter and thence to the passage 8 which communicates with the inlet ports 4.

It will be understood that only in the case of a multi-cylinder engine is there occasion to control by means of the valve the admission of air to the carbureter—such control being desired to insure that each plug shall receive its share of cooling air.

It will be seen that with the arrangement described not only is the sparking plug kept cool, but also local overheating in the neighborhood of the exhaust ports 5 is to a large extent counteracted.

In the case of the engine illustrated, which is designed to be water cooled, I provide for water-cooling the head 13 projecting into the interior of the cylinder, the water jacket for the head being in communication with the water jacket formed in the cylinder-cover 15 with which communicates the open-topped annular space between the walls of the liner 3—the latter being held in place by a flange projecting outwardly from the head 13.

Combined reciprocatory and oscillatory movements may be imparted to the valve by the driving gear now to be described.

Fitted on lugs 16 projecting radially from the outer end of the valve 11 is a hinge-pin 17 engaging a radial apertured arm 18 on a sleeve 19 mounted to slide on the crank pin 20 of a crank shaft 21 disposed to one side of the cylinder and driven at half the speed of the engine shaft, the crank pin 20 being rotatable in the sleeve 19.

The arrangement is such that in one extreme position of the movement of the hinge-pin 17 with the valve 11 a plane containing the axis of the hinge-pin 17 and the axis of the valve 11 is inclined preferably at substantially 45° to the axis of the crank shaft 21 as seen in plan, the hinge-pin 17 being movable in the direction to decrease such inclination, i. e., toward a position in which said plane is more nearly parallel to the axis of the crank shaft 21.

With this arrangement on rotation of the crank shaft 21 the valve 11 is reciprocated and also oscillated through the required angle to control the port openings.

It will be appreciated that an internal combustion engine constructed as described answers entirely the objects as hereinbefore set forth; the resultant advantages will be apparent to those skilled in the art.

It is to be understood that the invention in its broader aspects is not limited to the precise constructions described nor to any particular construction by which the invention has been or may be carried into effect, since many changes may be made in the details of the parts without departure from the essence and true scope of the actual invention as defined by the appended claims.

In the adaptation of the improvements to a multi-cylinder engine the channeled envelop is shaped to surround the various cylinders, so as in effect to form a monobloc engine though the cylinders are cast separately.

What I claim is:—

1. In a four-stroke internal combustion engine, in combination, a cylinder, a cylindrical valve seat fitted in the cylinder, said valve seat provided with admission and exhaust ports arranged alternately in a single circumferential row, a piston, and a sleeve valve separate from and surrounding said piston and movable within said valve seat, in a manner to cause points thereon to travel in substantially elliptical paths, said valve formed with ports adapted in the movement of the valve to be brought into and out of register with the ports in the valve seat.

2. In a four stroke internal combustion engine, in combination, a cylinder, a piston, a water cooled valve seat removably fitted within the cylinder, said valve seat formed with cylindrical walls spaced apart and with cross-tubes traversing the space between the walls and presenting admission and exhaust ports, a sleeve valve separate from and surrounding the piston and movable within said valve seat, said valve formed with ports adapted in the movement of the valve to be brought into and out of register with said admission and exhaust ports, and means for imparting to said valve reciprocatory movements in the direction of the axis of said cylinder and oscillatory movements around said axis.

3. In a four stroke internal combustion engine, in combination, a cylinder, a piston, a water cooled valve seat removably fitted within the cylinder, said valve seat formed with admission and exhaust ports, a sleeve valve separate from and surrounding the piston and movable within said valve seat, said valve formed with ports adapted in the movement of the valve to be brought into and out of register with said admission and exhaust ports, and means for imparting to said valve reciprocatory movements in the direction of the axis of said cylinder and oscillatory movements around said axis.

4. In an internal combustion engine, in combination, a cylinder, a piston, a water-cooled valve seat removably fitted within the cylinder, said valve seat provided with inlet and exhaust ports arranged alternately in a single circumferential row, a sleeve valve separate from and surrounding the piston and movable within the valve seat in a manner to cause points thereon to travel in substantially elliptical paths, said valve formed with ports coöperating with ports in the liner, and a cylinder cover formed with a head projecting into the cylinder and forming a water jacket.

5. In a four-stroke internal combustion engine, in combination, a cylinder, a piston, a liner forming a valve seat within the cylinder, said liner formed with double walls constituting an open-topped annular space and with cross tubes traversing the space between the walls and presenting ports, a sleeve valve separate from and surrounding the piston and movable within the liner, said valve formed with ports coöperating with ports in the liner, and a cylinder cover forming a water jacket in communication with the annular space.

6. In a four-stroke internal combustion engine, in combination, a cylinder, a piston, a tubular liner forming a valve seat within the cylinder, said liner formed with air ports and with admission and exhaust ports, and a sleeve valve separate from and surrounding the piston and movable within the liner, said valve formed with ports adapted in the movement of the valve to be brought into and out of register with said admission and exhaust ports, said valve adapted also to cover and uncover said air ports.

7. In a four stroke internal combustion engine, in combination, a cylinder, an air duct extending around said cylinder, a hollow head projecting into the cylinder and formed with ports for the passage of air, a stationary liner forming a valve seat within the cylinder formed with admission and exhaust ports and with air ports, and a sleeve valve movable within the cylinder and provided with ports adapted in the movement of the valve to be brought into and out of register with said admission and exhaust ports and to control said air ports whereby to establish and disestablish communication between the interior of said head and said air duct.

8. In a four stroke internal combustion engine, in combination, a cylinder formed with external open channels, a removable envelop surrounding said cylinder and formed with internal open channels forming in conjunction with the channels in the cylinder passages for air and for the mixture, a liner within the cylinder formed with admission and exhaust ports and with air ports, said admission ports being in communication with one of said passages and said air ports being in communication with the other of said passages, and a sleeve valve movable within the liner and serving to control said ports.

9. In a four stroke internal combustion engine, in combination, a cylinder formed with an external open channel, a removable envelop surrounding said cylinder casting and formed with an internal open channel, said channels forming in conjunction a duct for the mixture, a stationary ported liner forming a valve seat within the cylinder, and a sleeve valve movable within the liner and serving to control the ports of said liner.

10. In a four stroke internal combustion engine, in combination, a cylinder, a ported stationary liner forming a valve seat within the cylinder, a hollow cylinder head projecting into the interior of said cylinder and serving to carry the sparking plug, said head formed with ports permitting the passage of air through the head and past the sparking plug, an air duct extending around the cylinder, and a sleeve valve movable within the liner for controlling the passage of air through the ports in said head and said liner to said air duct.

In testimony whereof I have signed my name to this specification in the presence of two subscribing witnesses.

PETER BURT.

Witnesses:
WALLACE CRANSTON FAIRWEATHER,
HENRY MASON.